United States Patent [19]

Wissmann

[11] 3,747,742
[45] July 24, 1973

[54] BULK CONVEYOR
[76] Inventor: Kurt Wissmann, Muhlenheuweg 25, 4053 Suchteln-Hagenbroich, Germany
[22] Filed: Aug. 6, 1971
[21] Appl. No.: 169,607

[30] Foreign Application Priority Data
Aug. 10, 1970 Germany............... P 20 39 632.1

[52] U.S. Cl. .............................................. 198/221
[51] Int. Cl............................................ B65g 25/08
[58] Field of Search................... 198/221, 222, 223, 198/224, 225, 226

[56] References Cited
UNITED STATES PATENTS
1,404,983  1/1922  Lower.................................. 198/221
3,047,128  7/1962  Escher................................. 198/204
3,559,823  2/1971  Ostrin................................. 198/226

FOREIGN PATENTS OR APPLICATIONS
1,139,068  10/1962  Germany............................. 198/224

1,558,640  1/1969  France............................... 198/221

Primary Examiner—Richard E. Aegerter
Attorney—James H. Tilberry, Robert V. Vickers et al.

[57] ABSTRACT

An improved push bar bulk conveyor of the type comprising a conveyor trough in which a conveyor rod equipped with unilaterally acting material drivers can be longitudinally reciprocated by a cylinder and piston rod unit. In the subject invention, the cylinder and piston rod unit is mounted to extend in a slightly inclined position in a substantially vertical plane in order to reduce the inoperative length of the conveyor. The raised end of the cylinder and piston rod unit is affixed to a generally semicylindrical conveyor end wall at the material input or feed point in order to guide that material drawn toward the rear of the conveyor during the return stroke of the cylinder and piston rod unit forward into the operative area of the drivers.

2 Claims, 5 Drawing Figures

Patented July 24, 1973 3,747,742
2 Sheets-Sheet 1
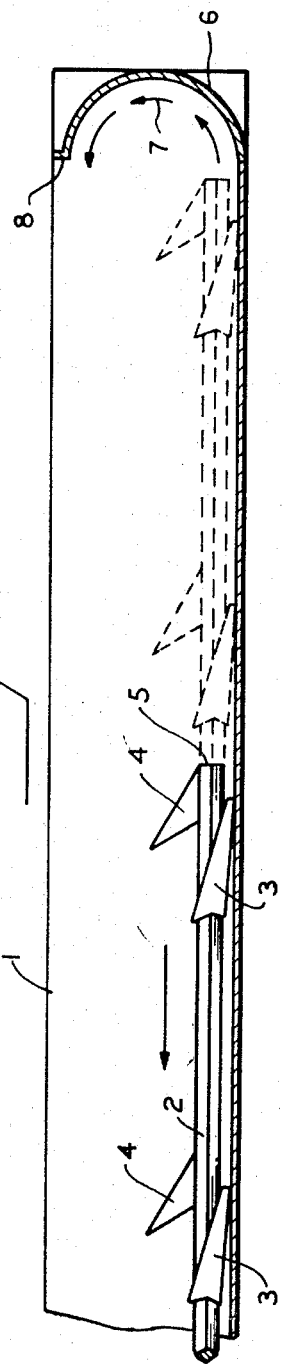
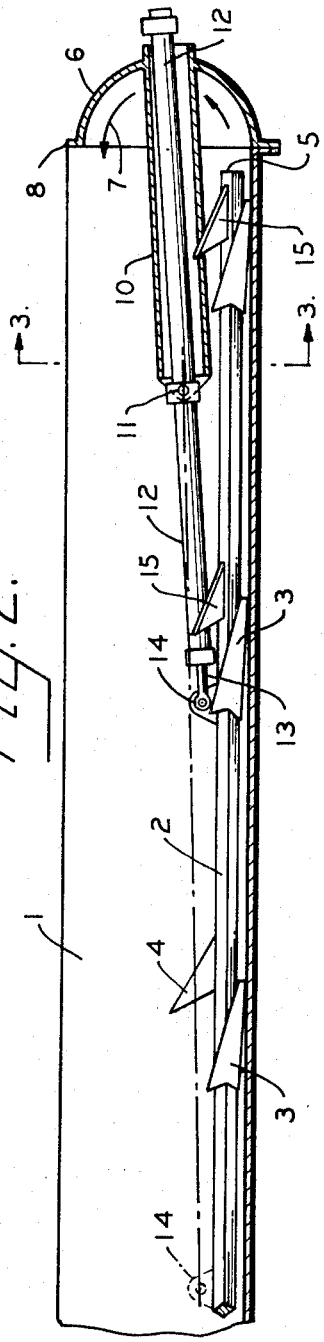
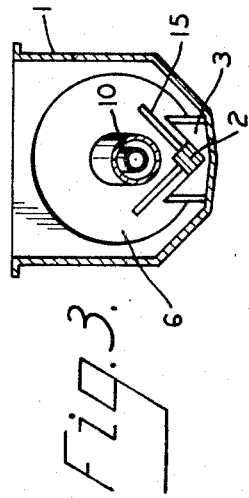
INVENTOR.
BY
Meyer, Tilberry & Body
ATTORNEYS.

Patented July 24, 1973   3,747,742
2 Sheets-Sheet 2
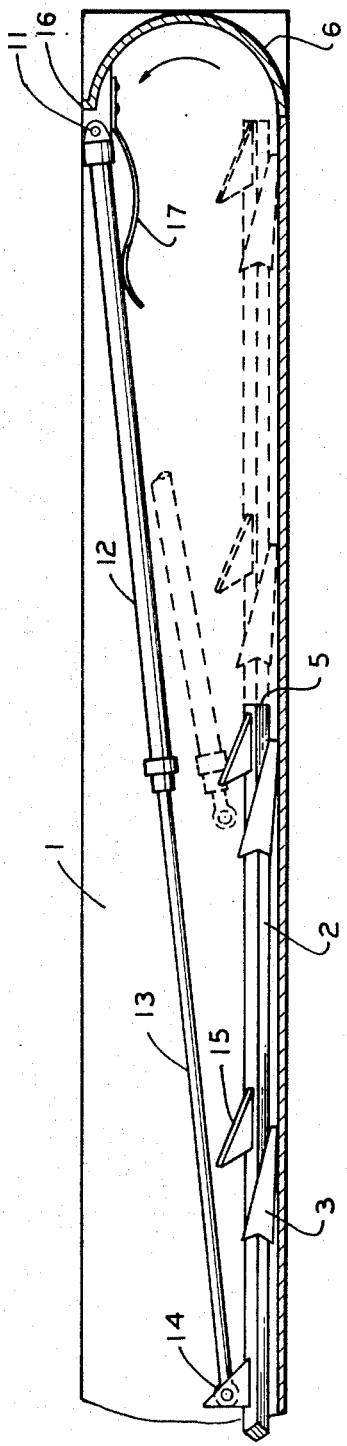
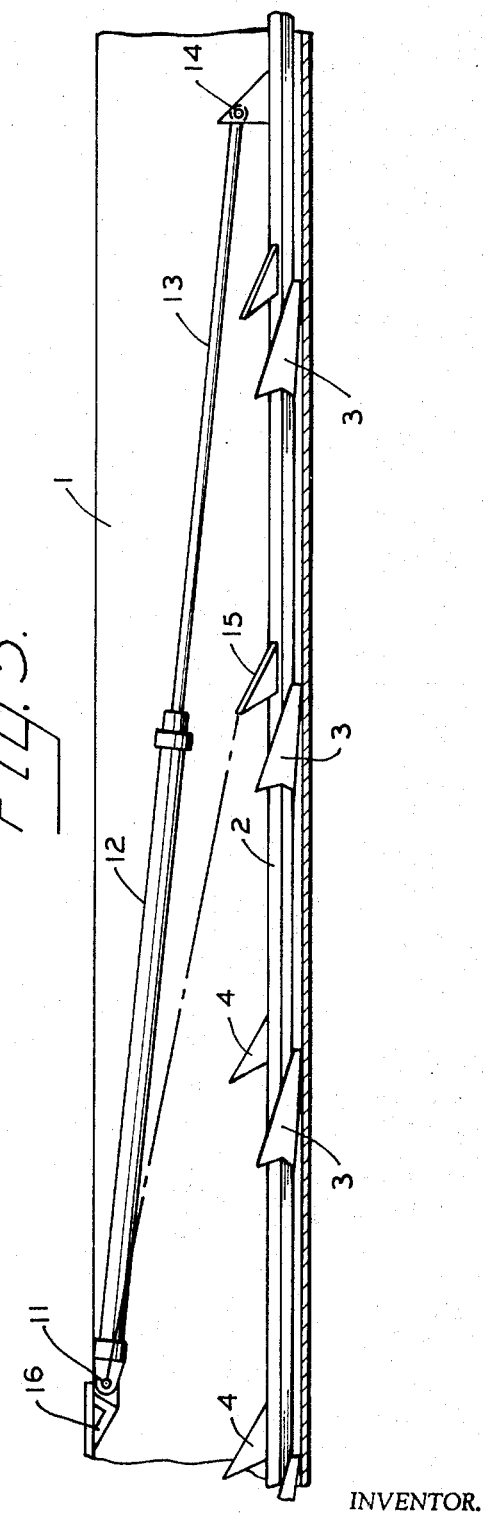
INVENTOR.
BY Meyer, Tilberry & Body
ATTORNEYS.

BULK CONVEYOR

The invention relates to a bulk conveyor, more particularly to a conveyor for use with metal chippings and other material difficult to convey and comprises a conveyor trough in which a conveyor rod equipped with unilaterally acting drivers can be reciprocated longitudinally by a rockably mounted cylinder and piston rod unit.

In prior art conveyors of this general type, the material is seized by drivers and conveyed forward in the conveying direction as the conveyor rod is moved in that same direction. When the conveyor rod is moved back in the opposite direction the drivers substantially force the material to one side and push only a small amount of the material in the backward direction. It is known to prevent possible resultant backing-up of some of the material at the start of the conveyor trough by lengthening the conveyor rod by two to three stroke lengths opposite to the conveying direction beyond the first feed station. This step limits the availability of the facilities for setting up with chip-producing machines and makes the conveyor more expensive to produce. Moreover, if the cylinder and piston rod unit is disposed upstream of the conveyor rod and axially thereof, the start of the conveyor is even further lengthened and requires so much space that as a rule, intermediate conveying means must be interposed between the chip-producing machines and the first conveyor feed station.

The present invention contemplates a new and improved apparatus which overcomes all of the above referred problems and others and provides a new and improved bulk conveyor which is simple and economical to employ and which provides improved bulk material movement along the conveyor.

In accordance with the present invention, the cylinder and piston rod unit extends in a slightly inclined position in a substantially vertical plane. The bottom end of the unit engages the conveyor rod portion equipped with drivers and the top end of the unit is articulated to a fixed point above the conveyor trough. This arrangement reduces the inoperative length of the conveyor resulting in a substantial reduction in the space it occupies. The inclined position of the cylinder and piston rod unit affords the further advantage that the conveyor rod is acted upon not only by a horizontal component of force in the conveying direction, but also by a perpendicularly directed component of force which retains the full entrainment of the material in the conveyor trough in the conveying direction and also provides the guidance for the conveyor rod in such trough.

The connecting link between the cylinder and piston rod unit and the fixed point can be a pivot. This step is recommended in dependence on the special conditions of operation, for instance, the nature of the material to be conveyed and conveying around curves.

In order to fully utilize the entire length of the conveyor trough for conveying the material, a loop channel is provided on the conveyor trough feed side which acts to circulate the material to a portion of the conveyor through which the drivers pass.

In one embodiment of the invention, the loop channel is a wall area bent upwardly substantially semicylindrically as a continuation of the conveyor trough feed side. A result of this arrangement is that the material entrained by the return stroke of the conveyor rod is fed around the curved wall acting as a loop channel. The conveyor rod end face therefore acts similar to a pusher but does not compact the material tightly as it merely pushes the material up around the loop channel which guides it back into the zone of action of the drivers.

In one embodiment of the invention, the fixed point for the articulation of the top end of the cylinder and piston rod unit can be on the loop channel wall. In a further development of this embodiment, a tube in which the drive cylinder is mounted extends through the conveyor trough loop wall. The tube acts both as a bearing and as a protective covering.

Also, the conveyor rod can move freely laterally and vertically in the conveyor trough. In this way, the conveyor rod can be adjusted in the conveyor trough in independence on the resistance offered by the material to be conveyed and can operate with minimum power construction without the occurrence of jamming. The perpendicular component of force of the cylinder and piston rod unit disposed at an inclination, and the weight and rigidity of the conveyor rod ensure that the conveyor rod always moves substantially over the bottom of the conveyor trough. Advantageously, the piston rod of the cylinder and piston rod unit can be resiliently borne.

The principal object of the present invention is the provision of a new and improved bulk material conveyor.

Another object of the present invention is the provision of a new and improved bulk material conveyor.

Another object of the present invention is the provision of a new and improved bulk material conveyor which requires a minimum amount of floor space in which to effectively operate.

Another object of the present invention is the provision of a new and improved bulk material conveyor which is inexpensive to manufacture.

The invention may take physical form in certain parts and arrangements of parts, preferred embodiments of which will be described in detail in this specification and illustrated in the accompanying drawings which form a part hereof and wherein:

FIG. 1 is a longitudinal cross sectional view taken through the feed side of a bulk conveyor having a conveyor rod and one loop channel;

FIG. 2 shows an embodiment of a bulk conveyor similar to that illustrated in FIG. 1 and having a cylinder and piston rod unit on the loop channel;

FIG. 3 is a cross sectional view of the bulk conveyor illustrated in FIG. 2;

FIG. 4 shows a variant arrangement of the cylinder and piston rod unit mounted at the start of the bulk conveyor; and, FIG. 5 shows another embodiment of a bulk conveyor having the cylinder and piston rod unit mounted in accordance with the present invention at the discharge end of the conveyor.

Referring now to the drawings wherein the showings are for the purpose of illustrating preferred embodiments of the invention only and not for purposes of limiting same, FIG. 1 shows a conveyor rod 2 which reciprocates longitudinally in a downwardly convergent conveyor trough 1. The forwardmost end position is shown in solid lines and the rearwardmost end position is shown by broken lines. The conveyor rod 2 is equipped with drivers 3 which are arranged in a generally V- shape and run over the bottom of the conveyor trough 1 to entrain the material, such as for example, metal chippings, disposed therein. Further, drivers 4 disposed along the top of the conveyor rod 2 act to boost entrainment of the material. End face 5 of the conveyor rod 2 impinges on the material poured in at the conveyor trough feed side and pushes it in the direction of a cylindrically bent loop channel wall 6. As shown by arrows 7, the material is diverted and returned to the working zone of the drivers 3, 4 by the pushing action of this end face. The first feed station 8 for the material can therefore be disposed directly at the start of the conveyor.

In the embodiment illustrated in FIG. 2, the mounting for one end of the cylinder and piston rod unit is transferred to the loop channel wall. To this end, a tube 10 bearing at the front end a rocker bearing 11 for a hydraulic cylinder 12 is inserted in the loop channel wall 6. The piston rod 13 of the cylinder 12 engages at a place 14 with an attachment of the conveyor rod 2. The cylinder 12 and the piston rod 13 rock around the rocker bearing 11 in dependence on the particular position of the conveyor rod 2. The use of drivers 15 (FIG. 3) directed upwardly at an inclination, facilitate the diversion of the material guided by the end face 5 of the conveyor rod 2 into the loop channel wall.

In the embodiment illustrated in FIG. 4, it should be noted that the rocker bearing 11 is articulated at a position 16 adjacent the top end of the conveyor wall 6 so that the intermediate area of the loop channel is left free. A leaf spring 17 is disposed adjacent position 16 on the top of conveyor wall 6 and resiliently bears against cylinder 12 to maintain a constant upward force against the cylinder.

Whereas, in the embodiments illustrated in FIGS. 1–4, the cylinder and piston rod unit exerts compressive forces in the conveying direction, in the embodiment illustrated in FIG. 5, the unit is disposed in the zone of the conveyor discharge side so that the power stroke of the unit has a pulling effect. This pulling effect thus avoids heavy bending stresses in the conveyor rod 2.

In place of a generally cylindrical curvature for the loop channel, use can be made of a part spherical or any other curvature, it merely being necessary that the material entrained by the conveyor rod during its return stroke be returned to the conveying zone of the drivers on the conveyor rod. Cleary, the backed-up material is kept moving by the shape of the start of the trough and is finally seized and then entrained in the conveying direction by the conveyor rod and any disturbances due to blocking and compacting are thus avoided. The conveyor shortening by a multiple of a stroke length facilitates a cheaper conveyor manufacture without any hindrance to the setting up of the chip-producing machines. Clearly also the piston rod of the drive is advantageously left free and a shallow inclined position is preferred for the cylinder and piston rod unit in order to render harmless the bending stresses by the power drive above the conveyor rod.

The invention has been described with reference to the preferred embodiment. Obviously, modifications and alterations will occur to others upon the reading and understanding of this specification. It is my intention to include all such modifications and alterations insofar as they come within the scope of the appended claims or the equivalence thereof.

Having thus described my invention, I now claim:

1. A bulk conveyor including an elongated conveyor trough, an elongated substantially straight and rigid conveyor rod reciprocatingly positioned in said trough for longitudinal reciprocating movement relative to said trough in a substantially straight line, said rod having unilaterally acting drivers thereon for conveying bulk material along said trough in one direction of movement of said rod, a cylinder and piston rod unit connected with said conveyor rod and with said conveyor trough for moving said conveyor rod in a feed stroke forwardly relative to said conveyor trough in said one direction to feed bulk material along said trough and in an opposite direction to reposition said conveyor rod for another feed stroke, the improvement comprising; said cylinder and piston rod unit being inclined relative to said conveyor trough and conveyor rod, said cylinder and piston rod unit having one end portion thereof pivotally connected with said conveyor rod at a first connection and having an opposite end portion thereof pivotally connected with said conveyor trough at a second connection above said conveyor rod and said first connection, said first and second connections being within the longitudinal confines of said conveyor trough.

2. The device of claim 1 wherein said conveyor trough includes a rear end wall, said rear end wall being upwardly reversely curved, said conveyor rod having a rear end, whereby material carried toward said rear end wall by said rear end of said conveyor rod during movement thereof in said opposite direction is deflected upwardly and forwardly by said rear end wall to fall back in said conveyor trough forwardly of said rear end of said conveyor rod in the rearmost position of said conveyor rod.

* * * * *